US011041660B2

(12) United States Patent
Black et al.

(10) Patent No.: US 11,041,660 B2
(45) Date of Patent: Jun. 22, 2021

(54) FORCED CONVECTION HEATER (71) Applicant: Rosemount Inc., Shakopee, MN (US)

(72) Inventors: Steven S. Black, Houston, TX (US); Willis Watkins, Cypress, TX (US); Jason P. Pratt, Cypress, TX (US)

(73) Assignee: Rosemount Inc., Shakopee, MN (US)

( * ) Notice: Subject to any disclaimer, the term of this patent is extended or adjusted under 35 U.S.C. 154(b) by 2 days.

(21) Appl. No.: 16/422,201

(22) Filed: May 24, 2019

(65) Prior Publication Data

US 2020/0096230 A1  Mar. 26, 2020

Related U.S. Application Data (63) Continuation-in-part of application No. 16/138,269, filed on Sep. 21, 2018.

(51) Int. Cl.
*G01N 30/54* (2006.01)
*F24H 3/10* (2006.01)
*G01N 30/06* (2006.01)
*F24H 9/20* (2006.01)
*G01N 30/02* (2006.01)

(52) U.S. Cl.
CPC ........... *F24H 3/102* (2013.01); *F24H 9/2071* (2013.01); *G01N 30/06* (2013.01); *G01N 2030/025* (2013.01)

(58) Field of Classification Search
CPC .................................. G01N 30/54; G01N 30/30
See application file for complete search history.

(56) References Cited

U.S. PATENT DOCUMENTS

| 3,945,567 | A | | 3/1976 | Rambach | |
|---|---|---|---|---|---|
| 6,157,778 | A | * | 12/2000 | Kadotani | F24H 1/142 392/483 |
| 6,851,467 | B1 | * | 2/2005 | Bamford | H01L 23/3672 165/120 |
| 2004/0170413 | A1 | * | 9/2004 | Atkins | F26B 13/10 392/484 |
| 2005/0258088 | A1 | | 11/2005 | Botelho et al. | |
| 2010/0226797 | A1 | | 9/2010 | Fritton et al. | |
| 2013/0052083 | A1 | | 2/2013 | Kirby et al. | |

(Continued)

FOREIGN PATENT DOCUMENTS

| JP | 61213441 A | 9/1986 | |
| WO | 200713602 A2 | 11/2007 | |
| WO | WO-2007136702 A2 * | 11/2007 | ............. G01N 30/30 |

OTHER PUBLICATIONS

International Search Report and Written Opinion for International Patent Application No. PCT/US2019/051476, dated Jan. 3, 2020, date of filing: Sep. 17, 2019, 12 pages.

*Primary Examiner* — Paul M. West
*Assistant Examiner* — Mark A Shabman
(74) *Attorney, Agent, or Firm* — Christopher R. Christenson; Kelly, Holt & Christenson PLLC (57) ABSTRACT

A heating assembly includes a heater extending in a longitudinal direction from a first end to a second end. Heat transfer fins are thermally coupled to the heater and extend in a direction transverse to the longitudinal direction. An airflow component is positioned proximate one of the first and second end and is configured to generate airflow along the plurality of heat transfer fins toward the other of the first and second end.

15 Claims, 8 Drawing Sheets (56) References Cited

U.S. PATENT DOCUMENTS

2014/0158094 A1* 6/2014 Meiller ............ F02M 25/0854
 123/518
2015/0059450 A1* 3/2015 Takahashi ............ G01N 30/30
 73/61.53

* cited by examiner

FORCED CONVECTION HEATER

CROSS-REFERENCE TO RELATED APPLICATIONS

The present application is continuation-in-part of and claims priority of U.S. patent application Ser. No. 16/138,269, filed Sep. 21, 2018, the content of which is hereby incorporated by reference in its entirety.

BACKGROUND

Various applications often necessitate a heating element to heat a sample or substance to a desired temperature. One example application is gas chromatography. Gas chromatography is the separation of a mixture of chemical compounds due to their migration rates through a chromatographic column. This separates the compounds based on differences in boiling point, polarity, or molecular size. The separated compounds then flow across a suitable detector, such as a thermal conductivity detector (TCD) that determines the concentration of each compound represented in the overall sample. Knowing the concentration of the individual compounds makes it possible to calculate certain physical properties such as BTU or specific gravity using industry-standard equations.

In operation, it may be necessary to position a gas chromatograph and/or other application within a hazardous environment having an explosive or combustible gas present. In this circumstance, the heating element may only operate under specific operating conditions to ensure that the heating element does not generate a source of ignition. For example, industry standard temperature classifications can specify a minimum ignition temperature threshold for a hazardous area. Additionally, temperature class ratings can specify a maximum surface temperature for an instrument in a particular environment.

However, in order to heat a sample or substance to a desired temperature, the heating element surface temperature may exceed the temperature classification. For example, a hazardous environment can be given a temperature classification rating of T6, indicating a minimum ignition temperature of 85° C. [185° F.] for the hazardous environment. However, a heating element within a gas chromatograph, or other device, may have to operate in excess of 85° C. to properly heat a mixture or substance to a desired temperature. Therefore, in order to comply with the industry standards, select devices may not be able to operate in hazardous environments.

SUMMARY

A heating assembly includes a heater extending in a longitudinal direction from a first end to a second end. Heat transfer fins are thermally coupled to the heater and extend in a direction transverse to the longitudinal direction. An airflow component is positioned proximate one of the first and second end and is configured to generate airflow along the plurality of heat transfer fins toward the other of the first and second end.

DETAILED DESCRIPTION OF ILLUSTRATIVE EMBODIMENTS

In accordance with embodiments of the present invention, a heating assembly is provided that allows various devices and enclosures, such as an analytical oven of a gas chromatograph, to be used in hazardous environments. In one example, a heating assembly is provided that requires less supply air with a lower exposed surface temperature, compared to a standard heating element, to heat a sample or mixture to a desired temperature through forced convection. This will be discussed further with respect to FIGS. 3-6. Additionally, while the present description will proceed for a heating assembly to be used within a gas chromatograph, it is expressly contemplated that the present heating assembly may be used in a wide variety of different applications and devices utilized in hazardous environments.

Figure 1:
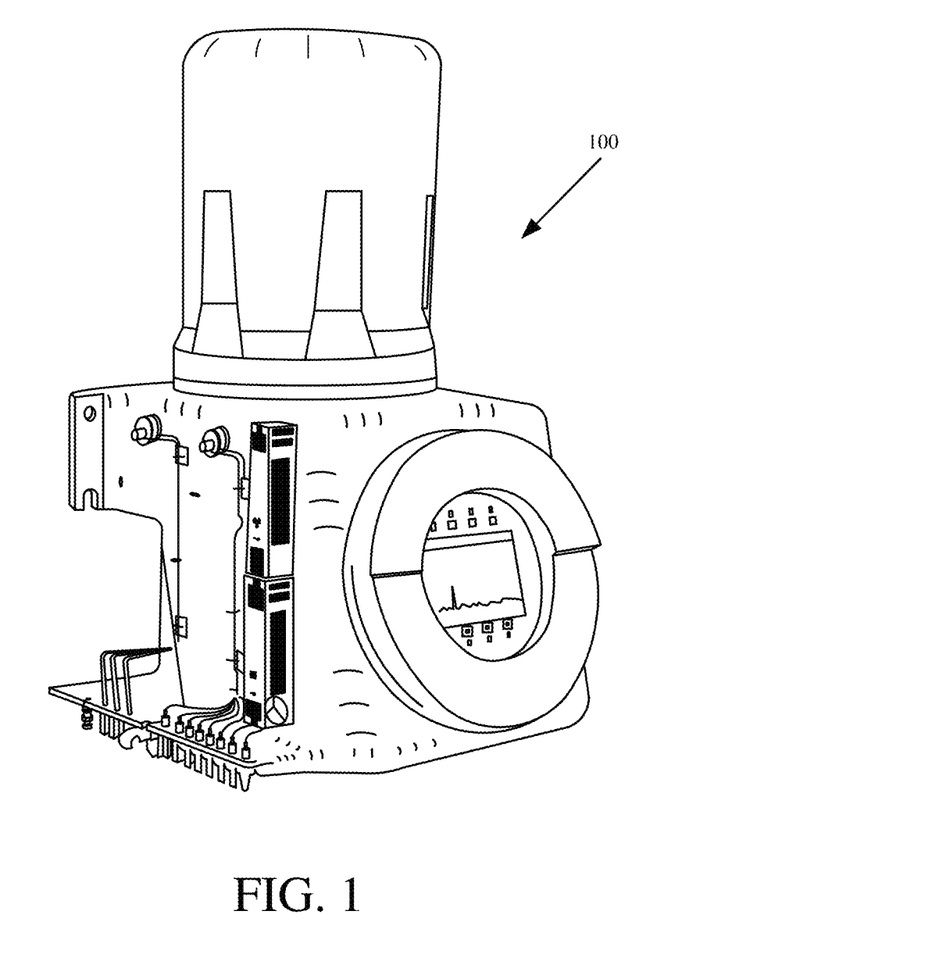
FIG. 1 is a diagrammatic view of a gas chromatograph with which embodiments of the present invention may be used.

FIG. 1 is a diagrammatic view of a gas chromatograph with which embodiments of the present invention may be used. While FIG. 1 illustrates a model 700XA gas chromatograph 100, available from Rosemount Inc., methods and embodiments provided herein may be utilized with other exemplary gas analyzers. This can include model 1500XA Process Gas Chromatographs and model 570 Natural Gas Chromatographs, both available from Rosemount Inc., among a variety of other types and models of gas chromatographs. Additionally, it is contemplated that a wide variety of other devices, beyond gas chromatographs, can be utilized with embodiments of the present invention.

Figure 2:
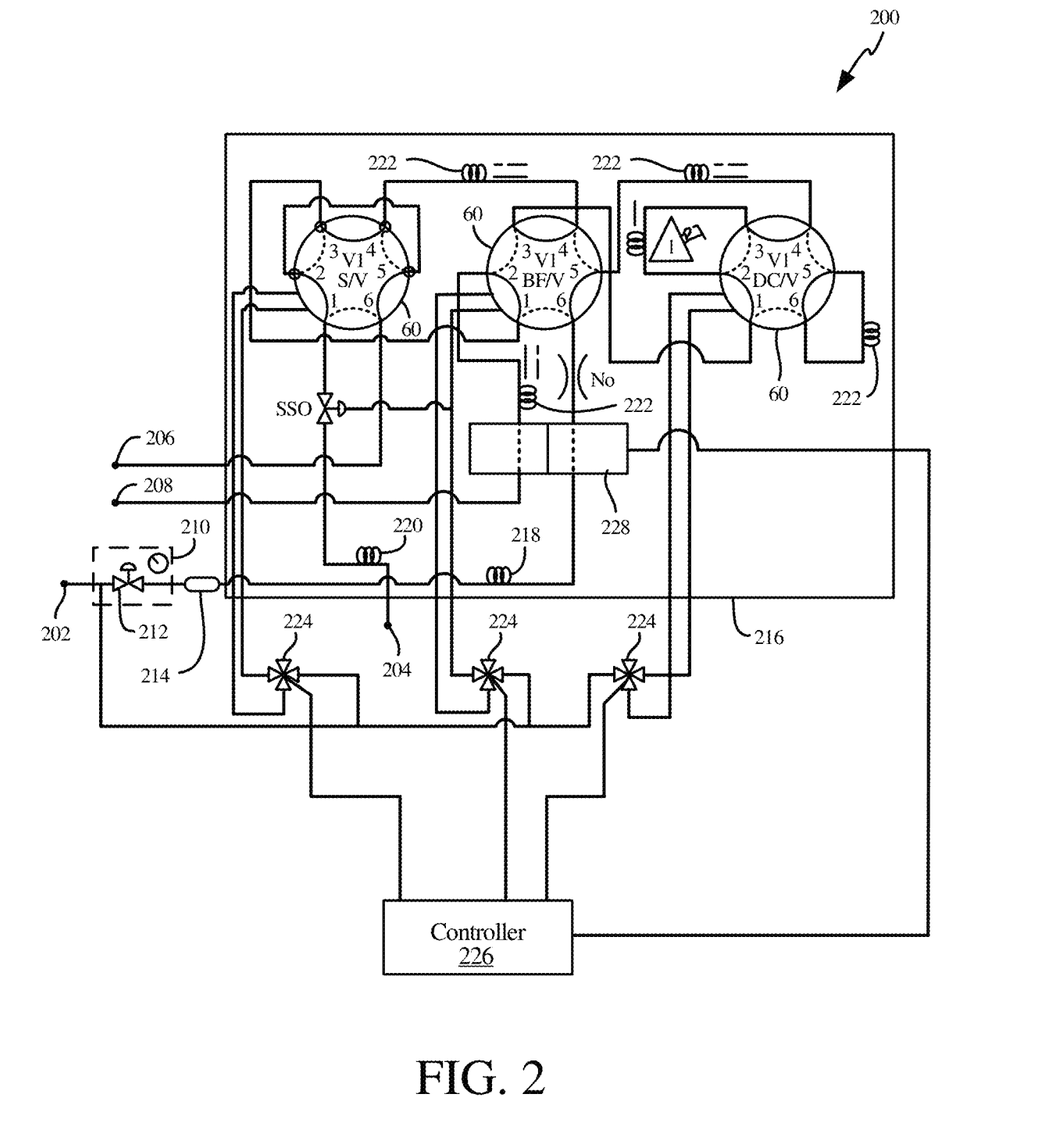
FIG. 2 is a diagrammatic system view of a gas chromatograph in accordance with an embodiment of the present invention.

FIG. 2 is a diagrammatic system view of a gas chromatograph in accordance with an embodiment of the present invention. While one example of a gas chromatograph 200 will now be provided, it is to be understood that gas chromatograph 200 can take a wide variety of other forms and configurations. For example, it is to be understood that gas chromatograph 200 may have other configurations for columns, valves, detectors, etc. However, in this example, gas chromatograph 200 illustratively includes a carrier gas inlet 202, a sample inlet 204, a sample vent outlet 206 and a measure vent outlet 208. In operation, carrier gas is provided to flow panel 210 where it passes through a regulator 212 and dryer 214 before entering analyzer oven 216 and passing through carrier gas pre-heater 218.

During measurement, sample gas enters chromatograph 200 via sample inlet 204 and passes through sample gas pre-heater 220 within analyzer oven 216. In accordance with embodiments of the present invention, heater(s) 218 and/or 220 can include heating assemblies that allow gas chromatograph 200 to be utilized in hazardous environments. This will be discussed further with respect to FIGS. 3-6. However, both sample gas (during measurement), or calibration gas (during calibration), and carrier gas eventually enter a plurality of pneumatically-controlled multiport selector valves 60 in order to selectively flow various volumes of a sample and/or carrier gas through various chromatographic columns 222 in accordance with known gas chromatography techniques. Each of pneumatically-controlled multiport selector valves 60 is fluidically coupled to a respective solenoid 224 that receives its control signal from controller 226.

Additionally, as shown in FIG. 2, each pneumatically-controlled multiport selector valve 60 has a pair of states. In the first state, the fluidic connections of each valve 60 are shown in solid lines. The fluidic connections of each valve 60 in the second state are shown in phantom. Controller 226 is also operably coupled to detector 228, which is, in one embodiment, a thermal conductivity detector disposed with analyzer oven 216. Thus, controller 226 is able to fully control flow through gas chromatograph 200 by virtue of controlling solenoids 224. Additionally, controller 226 is able to determine the response of detector 228 to gas flow therethrough. In this way, controller 226 is able to selectively introduce the sample into a chromatographic column for a selected amount of time, reverse the flow of gas through the chromatographic column; and direct the reverse flow through the detector to observe and/or record the detector response over time. This provides chromatographic analysis relative to the sample.

Figure 3:
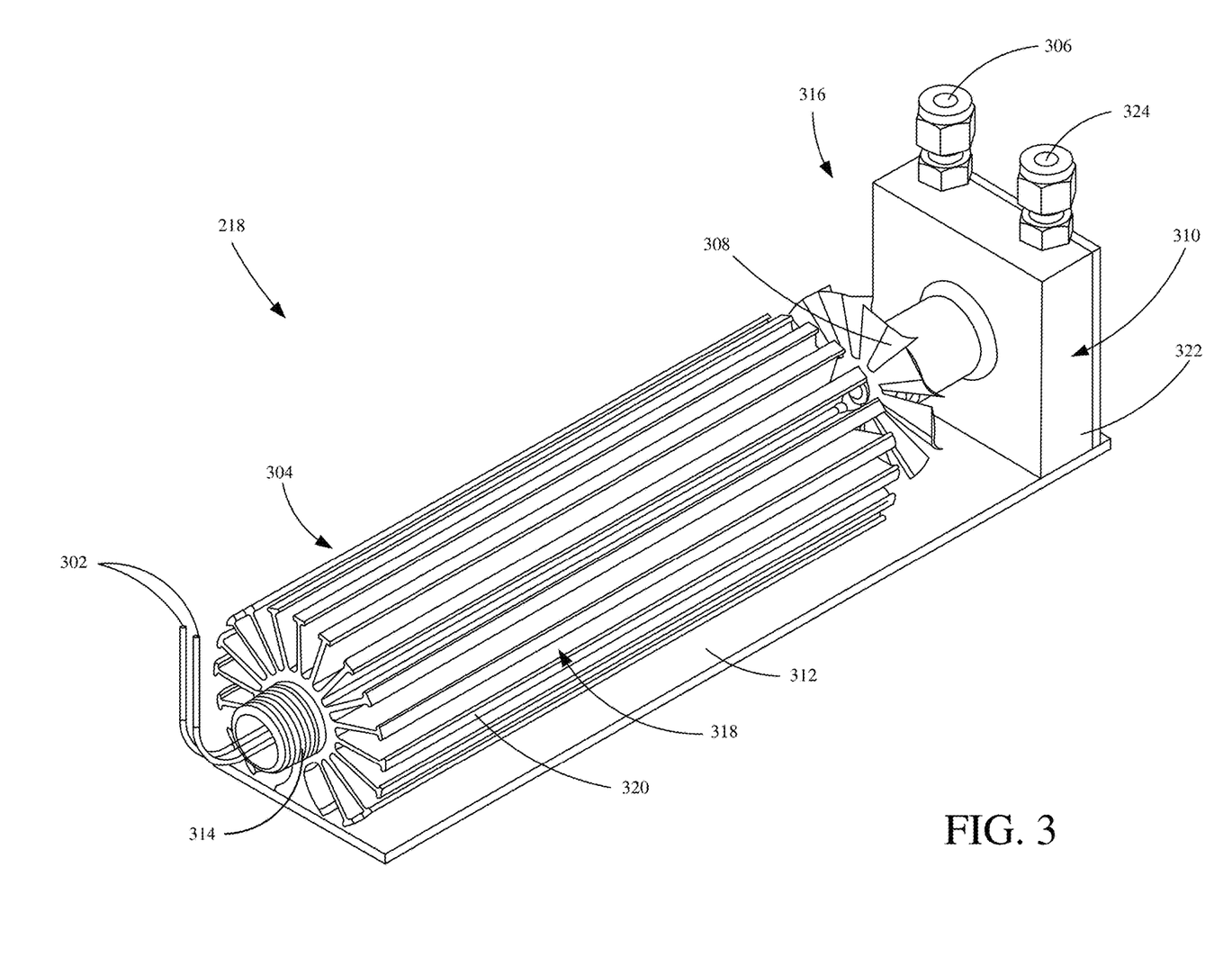
FIG. 3 is a diagrammatic view of a heating assembly in accordance with embodiments of the present invention.

FIG. 3 is a diagrammatic view of a heating assembly in accordance with embodiments of the present invention. Heating assembly 218 illustratively includes a heating component 304 and a fan assembly 316 attached to a base plate 312. Heating component 304 illustratively includes a heat sink 318 having a number of fins 320 radiating out from a housing portion (illustratively shown in FIG. 6) configured to house a cartridge heater. In operation, the cartridge heater, along with heat sink 318, can heat the surrounding air of heating assembly 218. While fins 320 of heat sink 318 illustratively fully extend along the housing portion, it is contemplated that, in other examples, fins 320 may only extend along a specific portion of the housing portion. In operation, the housing portion of heat sink 318 includes an inlet 314 for the cartridge heater that allows for leads 302 to extend through heat sink 318 to a heater power source. Leads 302 can be routed through a gland, conduit or other certified conveyance to the heater power source. Additionally, heat sink 318 can comprise any number of heat conducting materials such as aluminum, steel, or any other alloy.

Fan assembly 316 illustratively includes a fan 308 and a motor assembly 310. While motor assembly 310 will be described as a pneumatic motor, it is expressly contemplated that other types and configurations of motors can be used as well. For example, motor assembly 310 can include a rotary vane type and can be located external to an enclosure (e.g., analyzer oven 216 of gas chromatograph 200) of heating assembly 218. This can include hydraulic, electrical, mechanical or other types of pneumatic motors. However, in this example, motor assembly 310 includes a motor housing 322, an air inlet 324 and an exhaust port 306. In operation, compressed air is received, via air inlet 324, and drives a paddle wheel within motor housing 322 prior to exiting exhaust port 306. As will be discussed later with respect to FIG. 5, upon receiving compressed air, the paddle wheel drives a rotary shaft that extends through housing 322 and is attached to fan 308. Fan 308, in turn, can circulate the warmed air within an enclosure of heating assembly 218.

In this example, an enclosure of heating assembly 218 can be heated through forced convection in which the heated air adjacent heating component 304 is re-circulated within the enclosure through actuation of fan 308. This configuration allows for a reduction of necessary supply air required to heat the enclosure. Additionally, this also allows for a reduction in necessary power for heating assembly 218, while also allowing for a reduction in surface temperature for the heater cartridge within heat sink 318. Through forced convection, a gas chromatograph, or other device, with heating assembly 218 can heat a sample or mixture to a desired temperature while also complying with necessary industry standard temperature classifications for hazardous environments.

Figure 4:
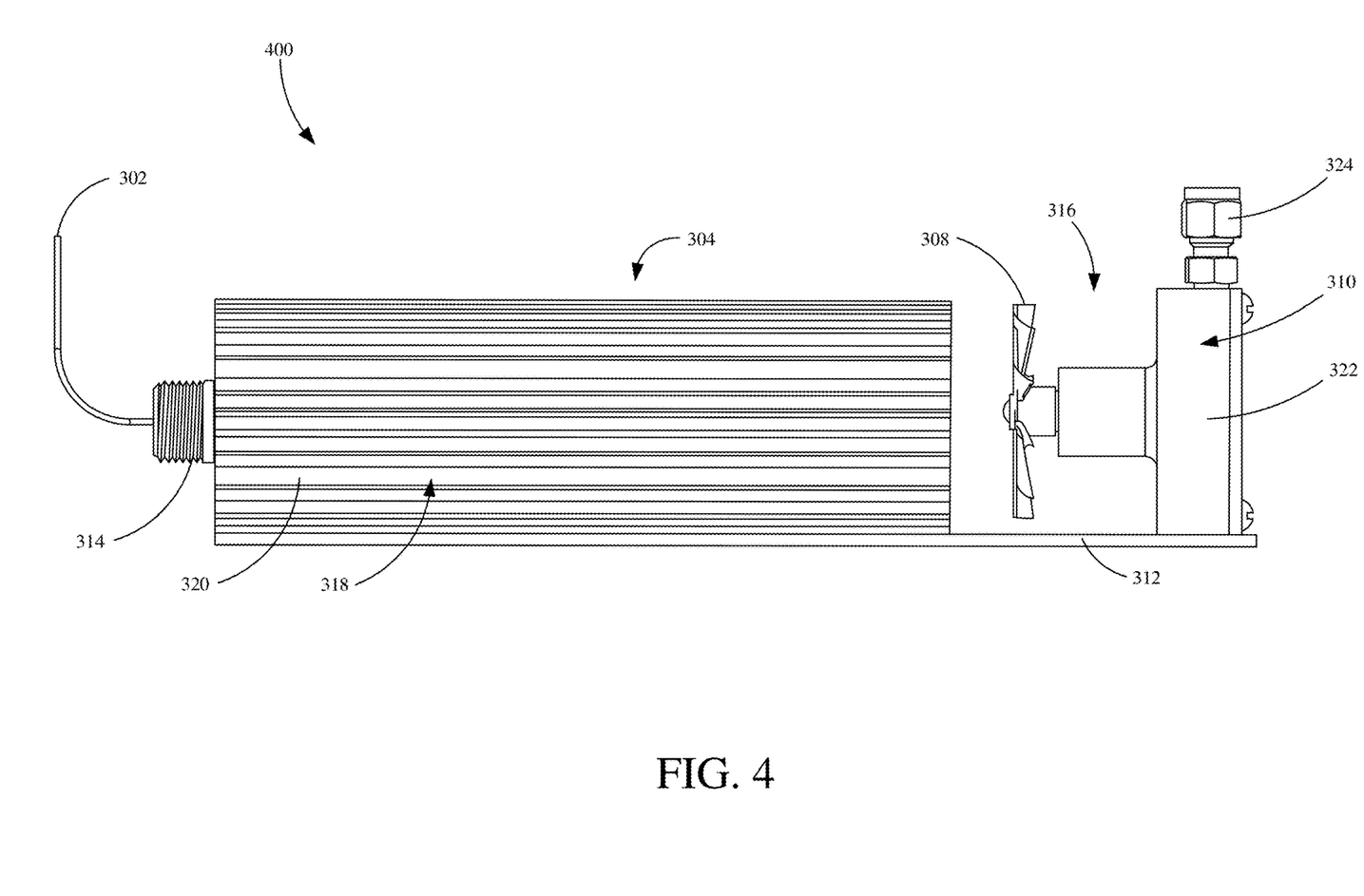
FIG. 4 is a diagrammatic side view of a heating assembly in accordance with embodiments of the present invention.

FIG. 4 is a diagrammatic side view of a heating assembly in accordance with embodiments of the present invention. Heating assembly 400 includes many of the same components as heating assembly 218, and, as such, is numbered similarly. Heating assembly 400 includes heating component 304 having a heating cartridge located within a housing portion of heat sink 318. Heat sink 318 illustratively includes radially-extending fins 320 and threaded inlet 314. In operation, one or more leads 302 coupled to the heating cartridge can traverse threaded inlet 314 and connect to a heater power source.

Heating assembly 400 also includes fan assembly 316 having fan 308 coupled to motor assembly 310. In accordance with different embodiments, fan 308 can take a variety of forms and configurations. For example, fan 308 can include a centrifugal type, and, additionally, does not have to align directly with heating component 304. For example, fan 308 can be positioned away from heat sink 318 and can still adequately recirculate the air in order to heat a sample or mixture within an enclosure of heating assembly 400. However, in the illustrated embodiment, fan assembly 316 includes motor assembly 310, with air inlet 324 and motor housing 322, aligned with heating component 304.

Figure 5:
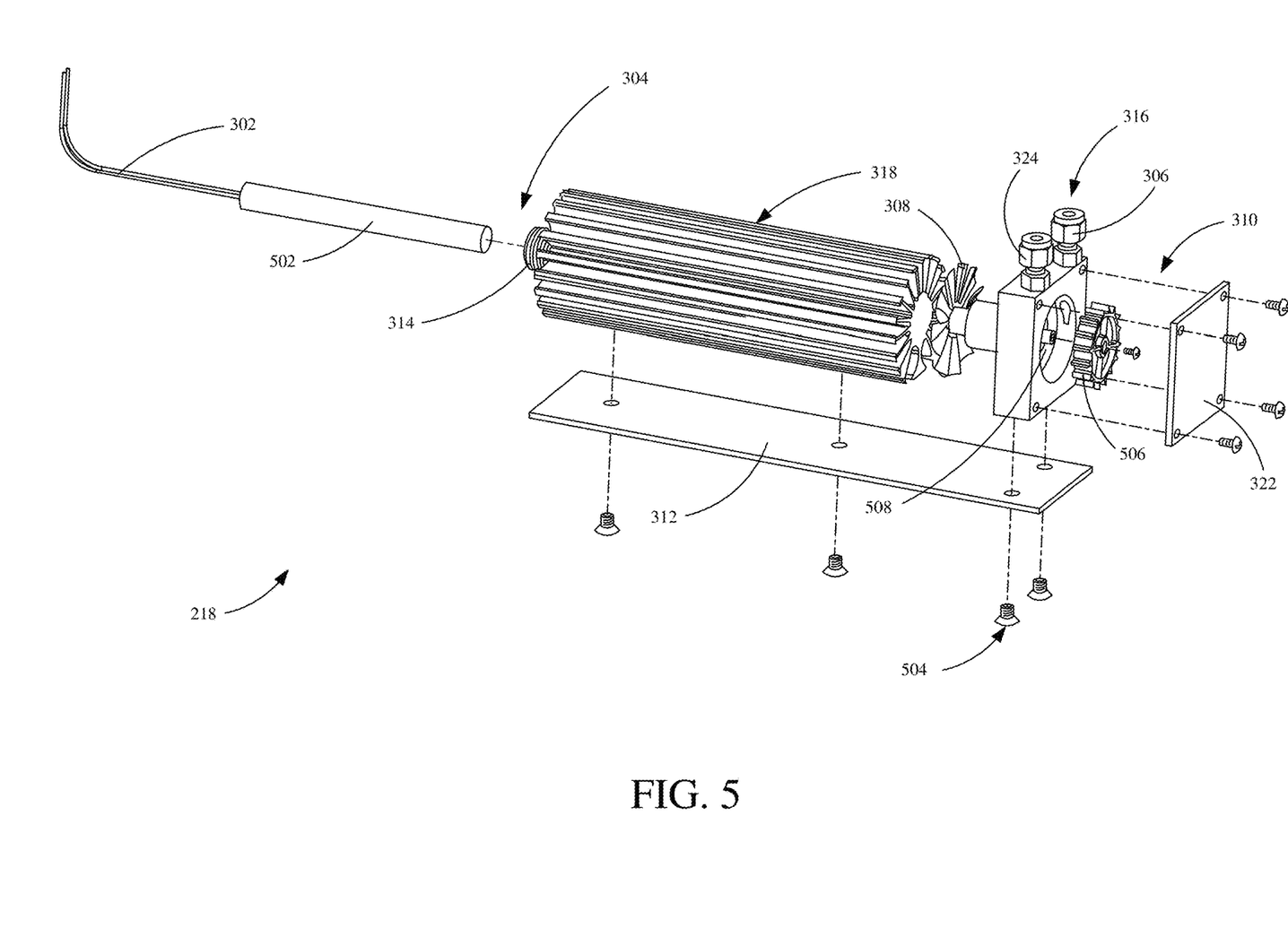
FIG. 5 is an exploded view of a heating assembly in accordance with embodiments of the present invention.

FIG. 5 is an exploded view of a heating assembly in accordance with embodiments of the present invention. Heating assembly 218 illustratively includes heating component 304, fan assembly 316 and base plate 312. As is illustratively shown, one or more fastening members 504 can be used to securely fasten heating component 304 and fan assembly 316 to base plate 312. Additionally, one or more fastening members 504 can be used to securely fasten other components of heating assembly 218 to each other. Heating component 304 includes a cartridge heater 502, coupled to a heater power source using leads 302, and a heat sink 318 that includes a housing portion and radially extending fins.

Fan assembly 316 illustratively includes fan 308 and motor assembly 310. Motor assembly 310 illustratively includes motor housing 322, air inlet 324, exhaust port 306, paddle wheel 506 and rotary shaft 508. In operation, compressed air can be received via air inlet 324 and used to drive paddle wheel 506 within motor housing 322 prior to being released via exhaust port 306. Paddle wheel 506, upon receiving the compressed air via air inlet 324, applies a rotary force to rotary shaft 508 which, in turn, drives fan 308. Fan 308, when actuated, circulates the heated air provided by heating component 304. This allows for a forced convection heater to heat an enclosure without necessitating a large quantity of supply air or an elevated surface temperature for cartridge heater 502.

Figure 6:
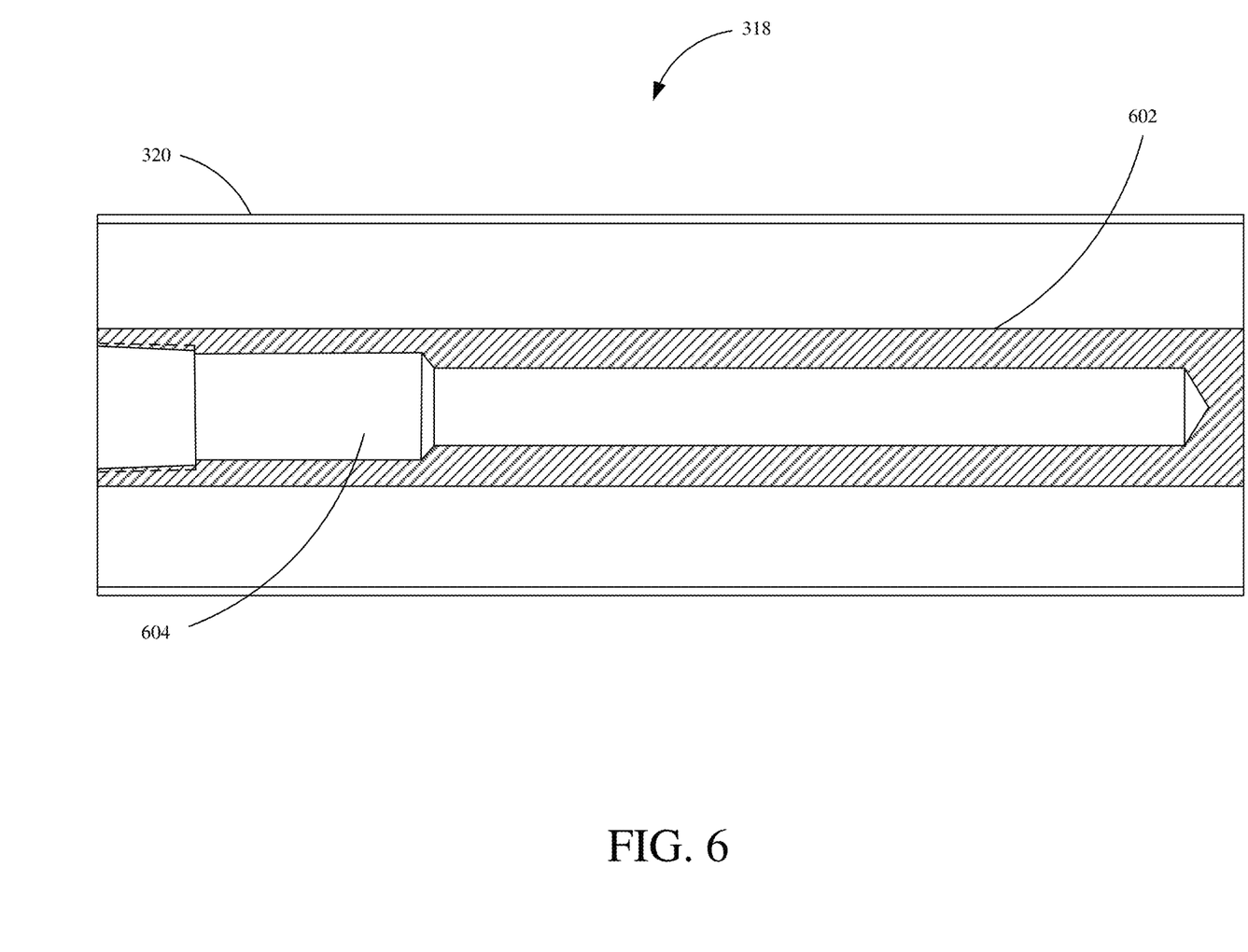
FIG. 6 is a cross sectional view of a heat sink of a heating assembly in accordance with embodiments of the present invention.

FIG. 6 is a cross sectional view of a heat sink of a heating assembly in accordance with embodiments of the present invention. Heat sink 318 illustratively includes a housing portion 602 and radially extending fins 320. Housing portion 602 is configured to house a heater cartridge (e.g., heater cartridge 502) within a bore 604 of housing portion 602. Bore 604 can take a wide variety of forms and configurations depending on a desired shape of a heater cartridge. In operation, a heater cartridge can be inserted into bore 604 and used to heat air adjacent to radially extending fins 320. Heated air may then be circulated around an enclosure using a fan assembly.

Figure 7A:
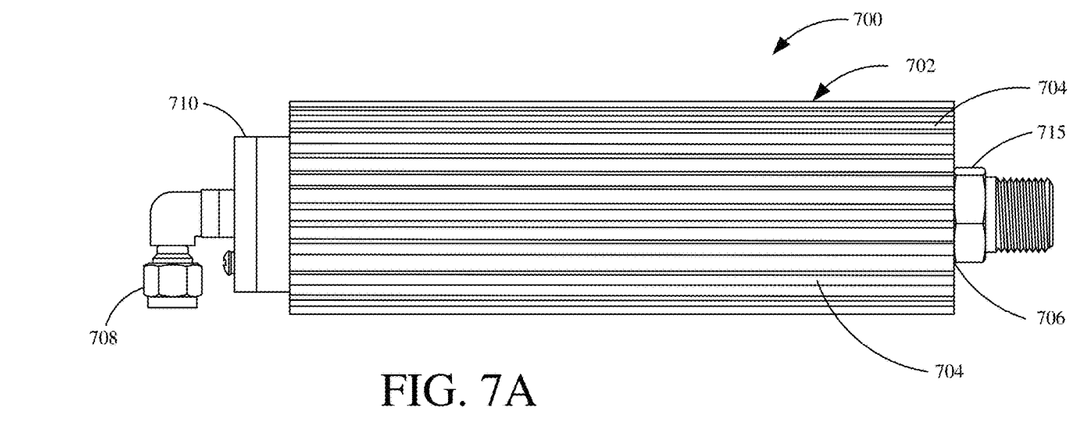
FIGS. 7A-7C are front elevation, side elevation, and perspective views, respectively, of a heat sink of a heating assembly in accordance with another embodiment of the present invention.

FIG. 7A is a diagrammatic front elevation view of a heating assembly in accordance with an embodiment of the present invention. Heating assembly 700 includes heatsink 702 formed a plurality of fins 704 extending radially from central portion 706 containing a heater (not shown in FIG. 7A). In contrast to previously-discussed embodiments, heating assembly 700 does not include a fan. Instead, heating assembly 700 includes a fitting 708 for coupling to an air supply. The supplied air is then conveyed to air distribution block or manifold 710 which includes a plurality of air apertures 712 (shown in FIG. 7B). When air is provided to fitting 708, the air will be distributed within air distribution block 710 and emitted from a various air apertures 712. The air will generally flow along the length of the individual fins 704 and be heated by contact with fins 704. In this way, heating assembly 700 generates heated air for the device. Additionally, FIG. 7A illustrates a fitting for an electrical conduit coupling in order to interface with the electric heater and thermal cutoff switch (shown in FIG. 8). In one example, fitting 714 is configured to threadably receive an electrical conduit or cable gland.

Figure 7B:
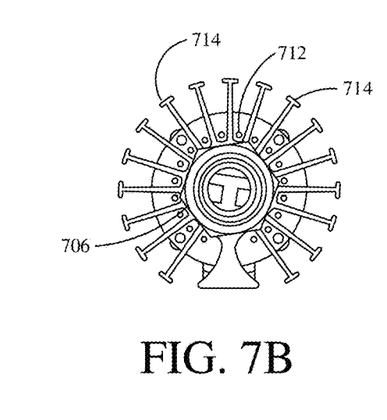

FIG. 7B is a side elevation view illustrating the various apertures 712 disposed between individual heatsink fins 714. As shown, distal ends of the heatsink fins 714 may include additional geometry (such as a T-shape) in order to increase surface area of the fins 714 as well as to help guide the air along the length of the assembly.

Figure 7C:
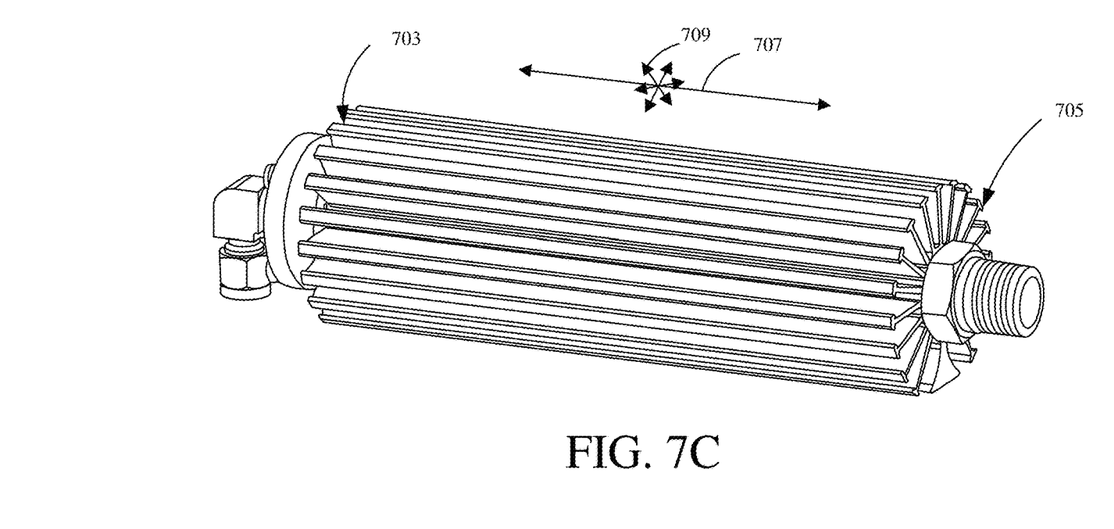

FIG. 7C is a perspective view of heatsink assembly 700 in accordance with an embodiment of the present invention. Heat sink assembly 700 includes a heater (shown in FIG. 8) that is disposed within central portion 706. The heater extends in a longitudinal direction 707 from first end 703 to second end 705. As can be seen, fins 704 generally extend in directions 709 that have a transverse component to the longitudinal direction 707. The air distribution block is disposed at one of ends 703, 705 and directs airflow along fins 704. In the embodiment shown in FIGS. 7A-7C, the assembly is generally shaped cylindrically. However, embodiments can be practiced with other geometries as well without departing from the scope of the invention.

Figure 8:
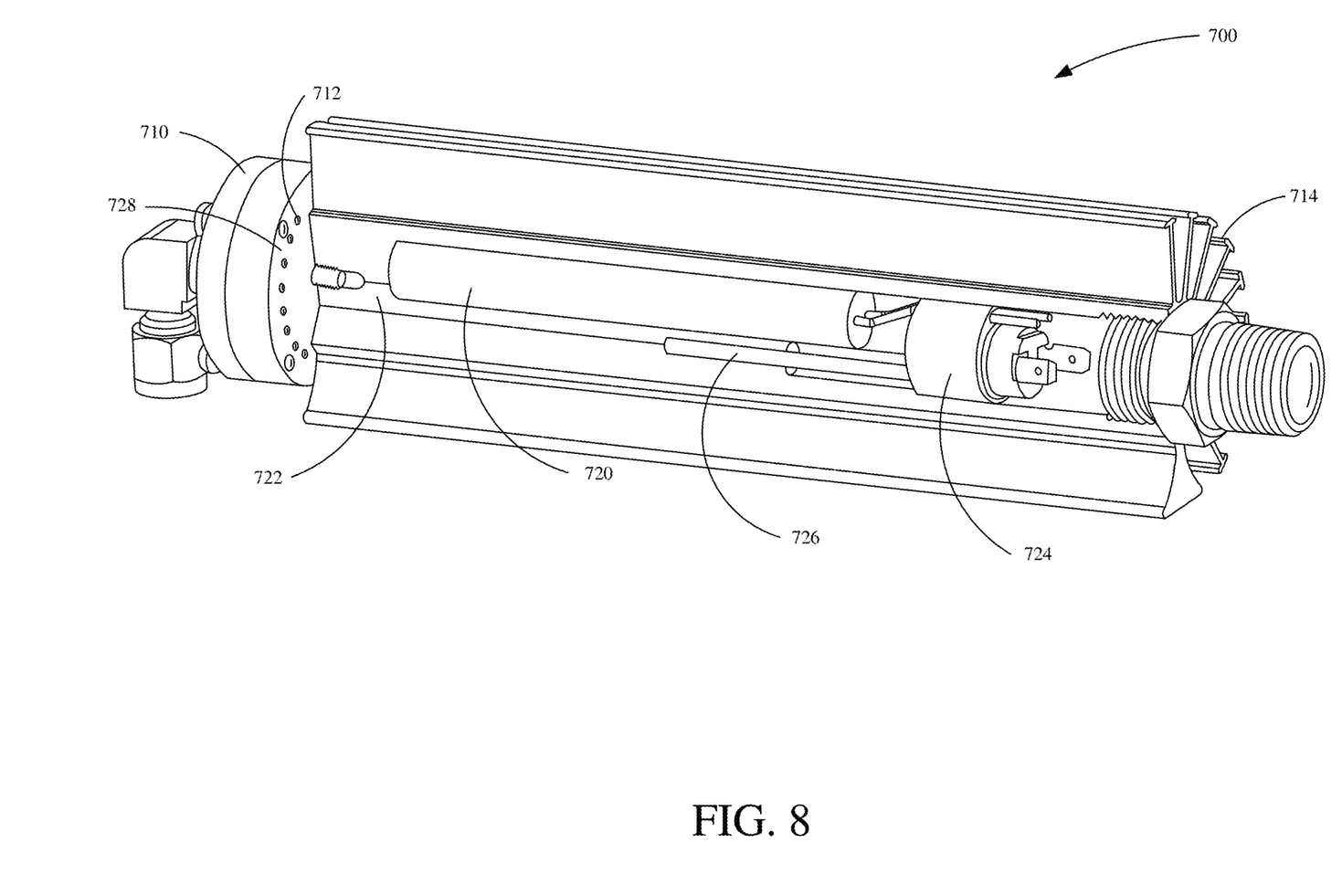
FIG. 8 is a perspective cut-away view of a heat sink of a heating assembly in accordance with another embodiment of the present invention.

FIG. 8 is a diagrammatic cutaway view of heating assembly 700 in accordance with an embodiment of the present invention. Heating assembly 700 is shown with a number of fins 714 removed and cutaway in order to expose the internal components of heating assembly 700. As shown, a heater, such as an electric cartridge heater 720 is disposed within central portion 706 of assembly 700 within metal bore 722. The metal bore 722 is also in thermal contact with each of fins 714 in order to provide robust heat flow. Additionally, a thermal cutoff switch 724 is also provided within central portion 706 of assembly 700. Thermal cutoff switch 724 may be any structure that is configured to generate an open circuit when a particular temperature is achieved. In one example, thermal cutoff switch 724 may include an internal bi-metallic structure that deforms in response to temperature and generates the open circuit (cutoff) at a selected temperature. However, any suitable structure that is able to interrupt the flow of electrical current to heater 720 at a selected or prescribed temperature can be used. As shown in FIG. 8, a heat pipe 726 is coupled to metal bore 722 proximate heater 720. Heat pipe 726 is also coupled to thermal cutoff switch 724. Heat pipe 726 utilizes known heat pipe technology to generate highly efficient heat flow from metal bore 722 to thermal cutoff switch 724. In this way, as the temperature of metal bore 722 rises, heat pipe 726 ensures that thermal cutoff switch 724 is quickly and efficiently brought to the same temperature. This provides enhanced thermal control for a relatively simple thermal element (thermal cutoff switch 724). However, those skilled in the art will recognize that other structures and techniques can be used to thermally couple thermal cutoff switch 724 to the internal temperature of heating assembly 700. For example, heat pipe 726 could simply be a solid metal rod formed of a relatively high thermal conductivity metal such as copper or aluminum.

FIG. 8 also shows a number of air supply apertures 712 disposed on a surface 728 of air distribution block 710. In one embodiment, air supply apertures 712 are positioned such that they are aligned between individual heatsink fins 714. Additionally, as shown in the embodiment in FIG. 8, the apertures 712 are positioned such that their centers are generally along a circle that is smaller than the outside diameter of air distribution block 710. However, it is expressly contemplated that there may be multiple air supply apertures disposed in the gap between each set of heat sink fins 714. For example, a second set of apertures could be similarly aligned with the heatsink fins 714 but be positioned such that their centers are along a circle having a larger diameter than the alignment circle for apertures 712. Additionally, while apertures 712 are shown as circles, it is also expressly contemplated that these may be machined as slots, ellipses, or any suitable shape that facilitates airflow.

Although the present invention has been described with reference to preferred embodiments, workers skilled in the art will recognize that changes may be made in form and detail without departing from the spirit and scope of the invention.

What is claimed is:

1. A heating assembly, comprising:
   a heater including a cartridge heater disposed in a metal bore, the heater extending in a longitudinal direction from a first end to a second end;
   a plurality of heat transfer fins thermally coupled to the heater and extending in a direction transverse to the longitudinal direction;
   an airflow component positioned proximate one of the first and second end and configured to generate airflow along the plurality of heat transfer fins toward the other of the first and second cud.

2. The heating assembly of claim 1, wherein the airflow component is an air distribution block coupleable to a source of air and configured to generate the airflow using a plurality of air apertures.

3. The heating assembly of claim 2, wherein each air aperture is disposed between a pair of heat transfer fins.

4. The heating assembly of claim 1, and further comprising a thermal control component operably coupled to the heater.

5. The heating assembly of claim 4, wherein the thermal control component is a thermal cutoff switch.

6. The heating assembly of claim 5, wherein the thermal cutoff switch is thermally coupled to the heater by a heat pipe.

7. A method of heating a device, the method comprising:
coupling an air distribution block to a source of air to receive input air from the source of air;
providing a heating assembly having a heater and a plurality of heatsink fins extending from the heater;
generating air flow from a plurality of air apertures in the air distribution block along the heatsink fins;
coupling the beater to a thermal cutoff switch using a heat pipe; and
controlling the heater using, the thermal cutoff switch.

8. A process gas chromatograph, comprising:
an analyzer oven configured to receive at least one sample, the analyzer oven including:
a heating assembly configured to heat the at least one sample, the heating assembly having a heating component including a cartridge heater disposed within a central portion having a first end and a second end, the central portion having a plurality of heatsink fins coupled thereto; and
an airflow component positioned proximate one of the first and second end and configured to generate airflow along the plurality of heatsink fins toward the other of the first and second end.

9. The process gas chromatograph of claim 8, and further comprising at least one chromatographic column disposed within the analyzer oven.

10. The process gas chromatograph of claim 8, wherein the airflow component is an air distribution block coupleable to a source of air and configured to generate the airflow using a plurality of air apertures.

11. The process gas chromatograph of claim 10, wherein each air aperture is disposed between a pair of heatsink fins.

12. The process gas chromatograph of claim 8, wherein the electric cartridge heater is disposed within a metal bore.

13. The process gas chromatograph of claim 12, and further comprising a thermal control component operably coupled to the heater.

14. The process gas chromatograph of claim 13, wherein the thermal control component is a thermal cutoff switch.

15. The process gas chromatograph of claim 14, wherein the thermal cutoff switch is thermally coupled to the heater by a heat pipe.

* * * * *